(12) United States Patent
Willsch et al.

(10) Patent No.: US 6,923,048 B2
(45) Date of Patent: Aug. 2, 2005

(54) METHOD AND APPARATUS OF MONITORING TEMPERATURE AND STRAIN BY USING FIBER BRAGG GRATING (FBG) SENSORS

(75) Inventors: Michael Willsch, Furth (DE); Thomas Bosselmann, Marloffstein (DE); Zal Sanjana, Pittsburgh, PA (US); Nils Theune, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/689,205

(22) Filed: Oct. 20, 2003

(65) Prior Publication Data

US 2005/0061058 A1 Mar. 24, 2005

Related U.S. Application Data

(60) Provisional application No. 60/505,700, filed on Sep. 24, 2003.

(51) Int. Cl.$^7$ .............................................. G01M 15/00
(52) U.S. Cl. ........................................................ 73/116
(58) Field of Search ............................... 73/116, 117.2, 73/117.3, 117.4, 118.1, 119 R

(56) References Cited

U.S. PATENT DOCUMENTS

| 6,396,572 | B1 |   | 5/2002  | Chang et al.      |         |
|-----------|----|---|---------|-------------------|---------|
| 6,470,205 | B2 | * | 10/2002 | Bosselmann et al. | 600/424 |
| 6,512,379 | B2 |   | 1/2003  | Harrold et al.    |         |
| 2001/0021843 | A1 | * | 9/2001  | Bosselmann et al. | 606/2 |
| 2002/0196994 | A1 | * | 12/2002 | Bosselmann et al. | 385/12 |
| 2004/0096614 | A1 | * | 5/2004  | Quigley et al.    | 428/36.3 |
| 2004/0114849 | A1 | * | 6/2004  | Shah et al.       | 385/13 |
| 2004/0129083 | A1 | * | 7/2004  | Fernald et al.    | 73/705 |
| 2004/0161197 | A1 | * | 8/2004  | Pelletier et al.  | 385/37 |
| 2004/0184700 | A1 | * | 9/2004  | Li et al.         | 385/12 |
| 2004/0202400 | A1 | * | 10/2004 | Kochergin et al.  |        |
| 2004/0206892 | A1 | * | 10/2004 | Martinez et al.   |        |
| 2004/0218863 | A1 | * | 11/2004 | Skull et al.      |        |

FOREIGN PATENT DOCUMENTS

| EP | 1 105 550 B1 | 6/2001 |
| EP | 1 235 089 A1 | 8/2002 |
| WO | WO 82 01365 | 4/1982 |

OTHER PUBLICATIONS

Mark Wippich and Kathy Li Dessau—Tunable Lasers and Fiber–Bragg–Grating Sensors, The Industrial Physicist, Jun./Jul. 2003, pp. 24–27.

Stefan Sandlin and Liisa Heikinheimo—Evaluation of a New Method for Metal Embedding of Optical Fibres for High Temperature Sensing Purposes, VTT Manufacturing Technology, P. O. Box 1704, FIN–02044 VTT, Finland, pp. 1–11.

Stefan Sandlin, Tuomo Kinnunen and Jaakko Ramo—Metal embedding of optical fibres for condition monitoring.

* cited by examiner

*Primary Examiner*—Eric S. McCall

(57) ABSTRACT

A method and apparatus for monitoring changes in temperature or strain, using fiber Bragg gratings (FBG). The Method and apparatus is advantageously useful for the measurement under harsh conditions, such as by combustion turbines. The invention uses the wavelength shift which is caused by temperature or strain changes at the FBG and the changing of the refraction index of the fiber.

21 Claims, 4 Drawing Sheets

METHOD AND APPARATUS OF MONITORING TEMPERATURE AND STRAIN BY USING FIBER BRAGG GRATING (FBG) SENSORS

CROSS REFERENCE TO RELATED APPLICATIONS

This application claims the benefits of the provisional U.S. application No. 60/505,700 filed Sep. 24, 2003.

FIELD OF THE INVENTION

The invention generally relates to a method and an apparatus of monitoring temperature and strain using fiber Bragg grating (FBG) sensors. More specifically, the invention relates to a method and an apparatus of monitoring temperature and strain of a metal component within a steam or combustion turbine using fiber Bragg grating (FBG) sensors.

BACKGROUND OF THE INVENTION

Steam or combustion turbines typically operate at extremely high temperatures, for example, 1500° F. to 2000° F. for steam turbines, respective 2500° F. to 2900° F. (1371° C. to 1593° C.) for gas turbines. Such high temperatures can cause failure of various components unless they are protected from the heat. These components include the rotating blades of the turbine, and the vanes for directing gas flow within the turbine. A typical combustion turbine will have three to four rows each of blades and vanes, with approximately 50 to 100 blades or vanes per row, and will typically have approximately 500 total blades and vanes to protect. A commonly used material for vanes and blades is superalloys such as nickel-cobalt. Other turbine components exposed to these high temperatures include the combustor and the transition. These high temperature components are generally insulated by a thermal barrier coating so that the turbine can be operated at such high temperatures without causing excessive deterioration of these components. A typical thermal barrier coating (TBC) is yttria stabilized zirconia.

Currently, it is necessary to periodically stop the turbine and inspect the components for deterioration of the thermal barrier coating, defects in other coatings, or other defects, for example, formation of cracks in the underlying components or spalling of the coating. The surface then heats up in that regions which weakens the superalloy body and causes further spalling of the coating. It would be desirable to monitor the condition of these components while the turbine is in use. Avoiding the need to periodically stop the turbine for inspection reduces downtime, increasing the turbine's efficiency. Likewise, early detection of defects reduces repair costs and outage time, again increasing turbine efficiency. Although other systems of monitoring the condition of turbines during use have been proposed, the present invention provides the unique advantage of providing early detection of defects, and a means of locating the defect; simplifying the inspection and repair procedure once a defect is identified.

An overall monitoring of temperature and strain of the TBC would it make possible to recognize hot spots and mechanical overload. In the past thermocouples and electrical strain gauges were used, which are only single point measurements and the bending of the metal wires limits the use of these sensors only to a few hours.

Therefore there is a need for a method and apparatus for the use of FBG sensors under harsh conditions.

SUMMARY OF THE INVENTION

A method and apparatus for the use of FBG sensors under harsh conditions is provided.

One aspect of the present invention is a method of monitoring the condition of a thermal barrier coating within a turbine engine having an operating temperature in excess of 1200° C., said method comprising: embedding and thermally protecting a fiber lead into the thermal barrier coating; embedding at least one fiber Bragg grating sensor into the thermal barrier coating such that the fiber Bragg grating is affected by a thermal or mechanical expansion of the thermal barrier coating; and using the thermal or mechanical expansion of the thermal barrier coating or the changing of a refraction index of the fiber to determine changes in temperature or strain of the thermal barrier coating.

Another aspect of the present invention involves an apparatus for monitoring the condition of a metal component, said apparatus comprising: a fiber lead embedded into the metal component; at least one fiber Bragg grating sensor embedded into the metal component such that the fiber Bragg grating is affected by a thermal or mechanical expansion of the metal component; and a mechanism using the thermal or mechanical expansion of the metal component or the changing of a refraction index of the fiber to determine changes in temperature or strain.

Another aspect of the present invention involves a metal component within a turbine engine, comprising: a fiber lead embedded into said metal component; at least one fiber Bragg grating sensor embedded into said metal component, wherein the fiber Bragg grating is affected by a thermal or mechanical expansion of the metal component; a light source which provides an incident spectrum which covers all wavelengths of the sensors; and a mechanism adopted to use the thermal or mechanical expansion of the metal component or the changing of a refraction index of the fiber to determine changes in temperature or strain of the component.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DESCRIPTION OF THE PREFERRED EMBODIMENTS

A concept of the present invention is the use of high temperature resistant fiber Bragg gratings (FBG) for the measurement of temperature distributions and the measurement of strain inside of turbines. Another concept is the durable real-time or near real-time monitoring of temperature and strain in ceramic thermal barrier coatings (TBC).

A preferred embodiment of the invention is a method and a system for monitoring of the condition of exposed high temperature components within a combustion turbine. The invention is particularly useful for monitoring the condition of the thermal barrier coating covering vanes and blades within the turbine. The significance and functioning of the present invention are best understood through a description of the environment within a combustion turbine.

Figure 1:
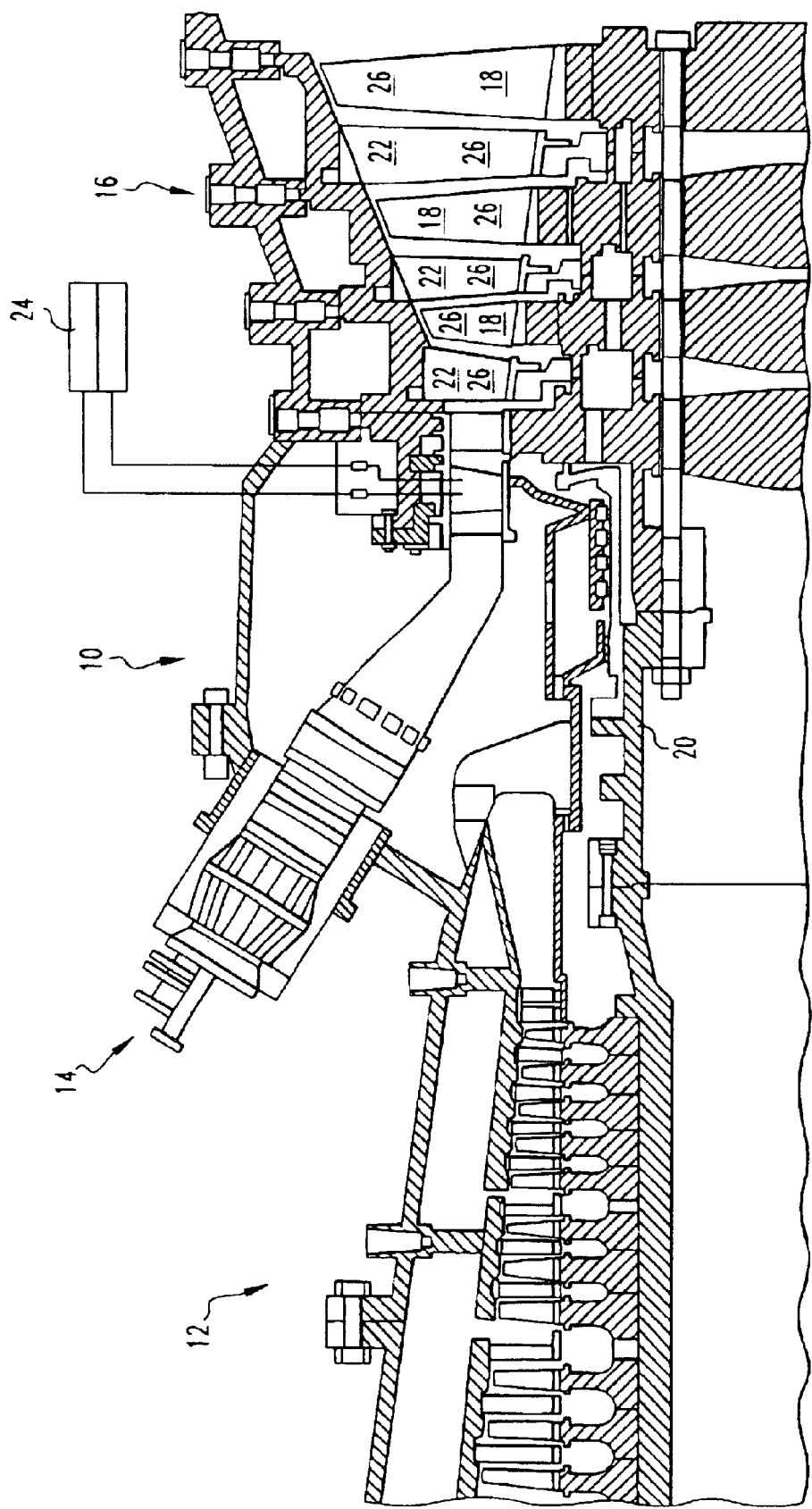
FIG. 1 is a cross sectional view of an exemplary combustion turbine in which the present invention can be used.

FIG. 1 illustrates a combustion turbine 10. The combustion turbine 10 includes a compressor 12, at least one combustor 14, and a turbine 16. The turbine 16 includes a plurality of rotating blades 18, secured to a rotatable central shaft 20. A plurality of stationary vanes 22 are positioned between the blades 18, with the vanes 22 being dimensioned and configured to guide air over the blades 18. The blades 18 and vanes will typically be made from a superalloy such as nickel-cobalt, and will typically be coated with a thermal barrier coating 26, such as yttria-stabilized zirconia. However, as will be understood by those skilled in the art, the blades and vanes may be made from other materials and may be coated by other materials.

In context of a combustion turbine, in operation, air is drawn in through the compressor 12, where it is compressed and driven towards the combustor 14. The combustor 14 mixes the air with fuel and ignites it, thereby forming a working gas. This working gas will typically be approximately 2500° F. to 2900° F. (1371° C. to 1593° C.). This gas expands through the turbine 16, being guided across the blades 18 by the vanes 22. As the gas passes through the turbine 16, it rotates the blades 18 and shaft 20, thereby transmitting usable mechanical work through the shaft 20. The combustion turbine 10 also includes a cooling system 24, dimensioned and configured to supply a coolant, for example steam or compressed air, to the blades 18 and vanes 22.

From the above description, it becomes apparent that the high temperature corrosive environment wherein the vanes 22 and blades 24 operate is particularly harsh, resulting in serious deterioration of the blades 18 and vanes 22 if the TBC 26 should deteriorate.

A FBG 32 is a structure which is typically burnt in a fiber, preferably a glass fiber, by a mask and UV Laser or other suitable mechanism. Therefore the fiber itself can act as a lead of the FBG 32 which transmits light to the FBG region and back. In accordance with the principles of the present invention, a standard fiber such as any single mode or multiple mode fiber can be used as the FBG. The use of single mode fibers allows a simpler configuration of the invention compared to the use of multiple mode fibers (e.g. you have to take into account the Raman scattering or spontaneous Raman scattering of temperature). Other suitable FBG are disclosed in the article "Tunable Lasers and Fiber-Bragg-Grating Sensors" by Mark Wippich and Kathy Li Dessau, published in The Industrial Physicist, June/July 2003 is herein incorporated by reference in its entirety.

The FBG 32 is advantageously partially or completely covered with a metallic coating such as Au, AG, Ni, Cr, combinations thereof and the like to withstand the high temperatures inside the turbine 16. In addition or instead of the metallic coating, the fiber lead can be protected by a layer of heat resistant material, such as stainless steel or Nickel tube 34. Other materials for the tube 34 or sheathing can be steel alloy, Titatium, Nickel, combinations thereof and the like.

The fiber optical Bragg gratings (FBG) can be placed in the same tube or embedded into some part of the turbine 16. For the FBG to have a proper temperature measurement and good thermal contact with the turbine or the TBC, the FBG 32 is advantageously packaged in a suitable manner as described below.

In one example, the FBG 32 is loosely packaged in the tube 34 which can be accomplished for example, by helically winding the FBG into the tube or by meander-like introduction of the FBG 32 into the tube 34. This loose packaging is advantageous to avoid strain influence on the temperature measurement and to place the fiber 31 and the FBG 32 loose in the tube or in a hole is easy to accomplish. The fiber 31 is fed into the tube 34 until the FBG 32 has reached the measurement position. Little strain caused by vibration and/or thermal expansion of the steel can limit the accuracy of this packaging. Advantageously the tube can be filled with air or a soft heat resistant filling material to improve the thermal contact to the environment.

Instead of a tube as another advantageous embodiment the fiber 31 can be feed into a thin hole in the steel alloy or the TBC. Furthermore instead of a tube other shapes for protecting the fiber lead and the FBG can be used such as half tubes, grooves, capillaries etc. However, as will be understood by these skilled in the art that other shapes can be used to protect the fiber lead and the FBG.

Furthermore, the FBG can be mounted on or within a suitable heat resistant carrier which provides relief from strain coming through the fiber. For example, the fiber can be placed on a small substrate from steel, ceramic or other suitable material. Thermal expansion of the substrate increases the thermal effect to the FBG. The carrier may be placed in a housing and is advantageously in close thermal contact to the superalloy blade or vane. For temperature measurement strain to the carrier then has to be avoided by construction. For example, by loose or soft packaging of the carrier or a single point mount of the carrier. For strain measurement a good mechanical contact between the carrier and the superalloy steel can be realized e.g. by welding, brazing and screwing.

The FBG can also be embedded directly into components of the turbine 16. The embedding into stainless steel components can be done for example, by arranging the fiber into a narrow gap and closing the gap. For example, the gap can be closed by welding, brazing or braze welding. The FBG then follows the thermal expansion of the structure. This embodiment can be used for temperature measurement and strain measurement as well. A temperature compensation of static strain measurement can be done by a separate temperature measurement.

FBG can be manufactured out of standard light wave guides by UV-Laser and phase mask among other methods. The physical principle of a FBG sensor is that a change in strain, stress or temperature will change the center of the wavelength of the light reflected by an FBG. Each fiber has a refraction index. The refraction index of a fiber depends on the density dopants it contains. Zones of different refraction indexes form a grating. A preferably white light spectrum is brought into the fiber and the interference causes a monochromatic refraction. The refraction of the light wavelength is determined by the grating constant and the refraction index of the fiber. The grating constant is defined as the distance of two grating lines. Changes of the grating constant allow the measurement of mechanical strain or stress. Changes of the refraction index allow the measurement of temperature. The measurement of temperature is also possible by monitoring the thermal expansion of the TBC or the metal. The sensitivity of the measurement is about 10 times higher if the refraction index is used to determine the change. The wavelength shifts indicate alterations of strain, stress or temperature. Since strain, stress or temperature states of fiber Bragg gratings have a direct impact on their reflectivity spectrum, they can be used for a variety of sensing applications.

Figure 2:
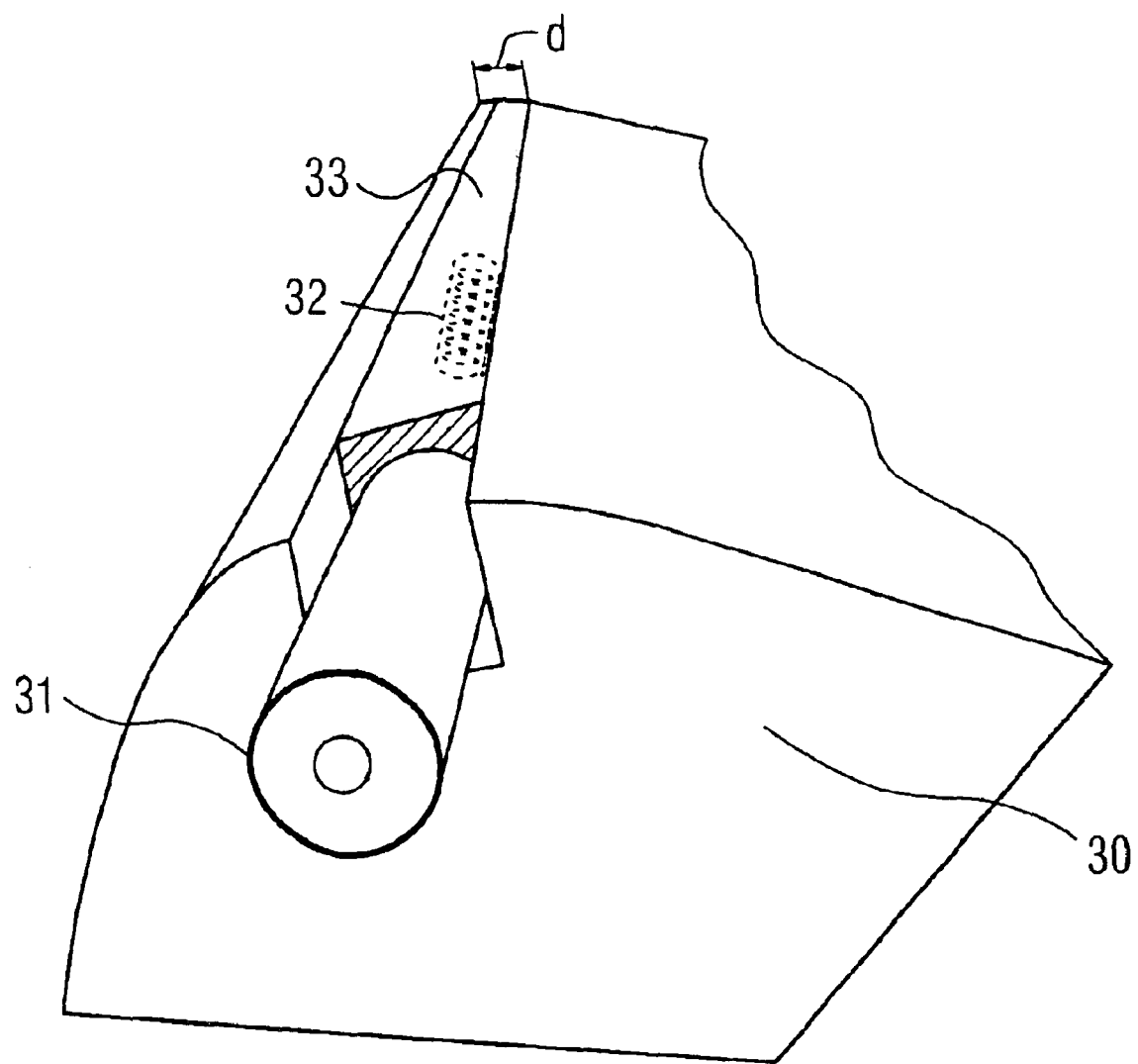
FIG. 2 shows an embodiment of the present invention used for strain measurement.

FIG. 2 shows an embodiment of the invention which is preferably used for strain measurement. The fiber 31 and the FBG 32 can be embedded in a superalloy metal 30 or the TBC coating. Strain sensors require strong mechanical contact, therefore for strain measurement the fiber 31 is advantageously embedded directly into superalloy metal 30 or the TBC coating. For protection reasons (e.g. against high temperature or deterioration) the fiber 31 is coated with a robust metal coating). For example, the fiber 31 and the FBG 32 can be embedded into a trench 33. If a trench is used, the trench 33 may be formed to any desired shape by any known method, such as laser engraving to have a generally rectangular cross-section with a suitable width and depth. Variables for such a laser engraving process include spot size, power level, energy density, pulse frequency and scan speed. These variables together affect the trench width, depth, material removal rate and the cost of manufacturing. Trench 33 may have a constant cross-sectional size and shape along its entire length, or it may vary in size and/or shape from one region to another. The trench 31 may also be inclined to the surface, i.e. varying in depth along its length, which in some applications may provide mechanical integrity within the superalloy metal 30. A trench with is inclined to the surface can be used for concurrent measurement of the TBC coating and the superalloy metal 30 using only one fiber 31. These skilled in the art know that the fiber 31 and the FBG 32 can also be embedded into a narrow gap or groove (e.g. an U-shaped groove). For example, the trench, gap or the groove can be closed by welding, brazing or braze welding.

Instead of a trench, the fiber 31 can be feed into a thin hole which is contained in the superalloy metal 30 or in the TBC coating of the surface of the superalloy metal. For example, this hole can be accomplished by drilling or laser beaming the superalloy metal 30. In FIG. 2 the width d of the trench is advantageously about 200 $\mu$m. This embodiment can be used especially for strain measurement. To assure a good mechanical contact for strain measurement the trench can be filled by metal or glue.

Figure 3:
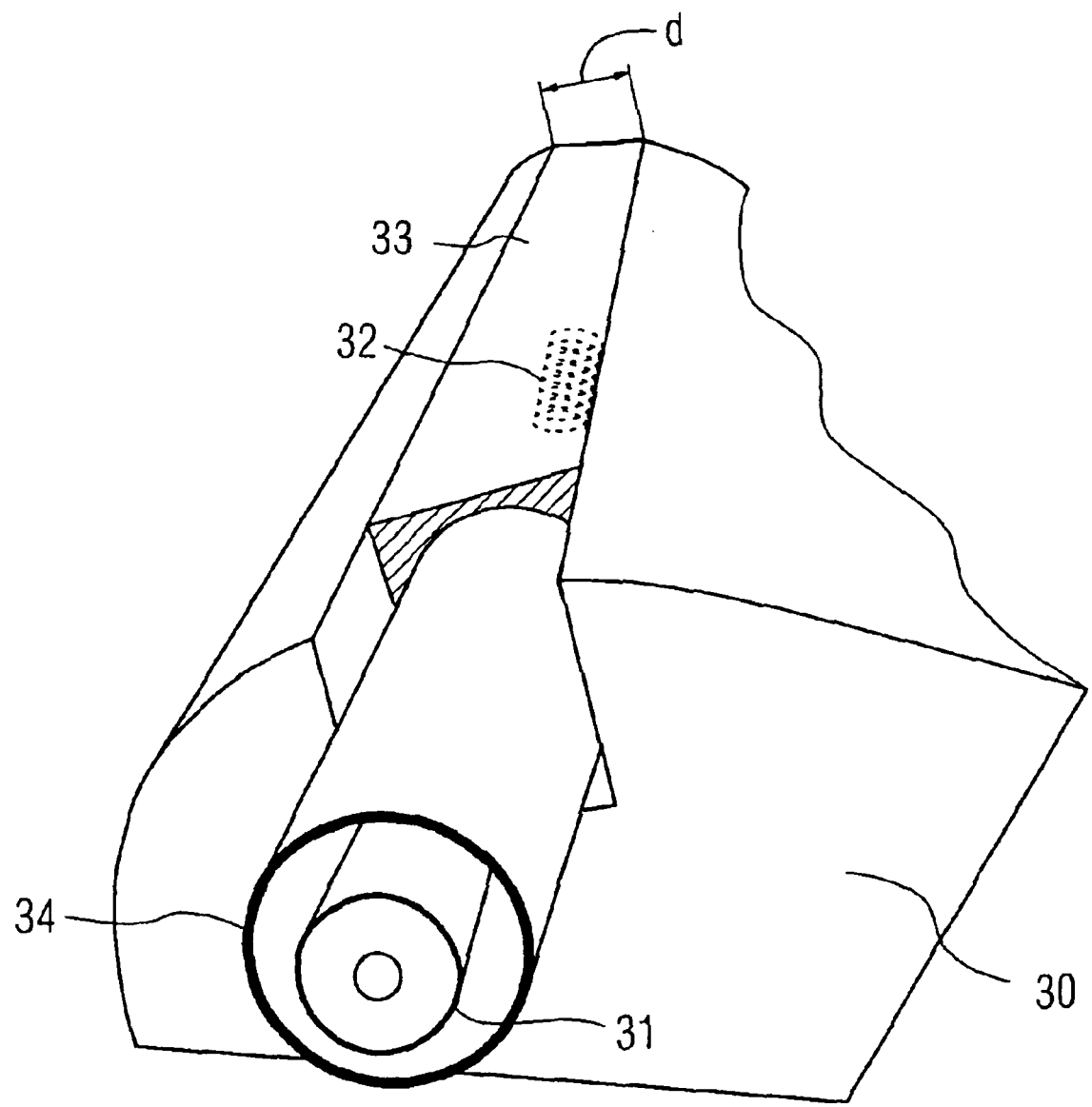
FIG. 3 shows another embodiment of the present invention used for temperature measurement.

FIG. 3 shows another embodiment of the present invention which is preferably used for temperature measurement. The fiber 31 and the FBG 32 can be embedded in a superalloy metal 30 or the TBC coating. In the hot region of the turbine the fiber 31 can be placed in a thin stainless or Nickel tube 34. The FBG can be placed in that same tube 34 or embedded into some part of the turbine or engine. For temperature measurement a good thermal contact of the superalloy metal 30 or the TBC coating is important. This can be accomplished by loose packing of the FBG 32. The FBG 32 can be loose in the tube 34. For example, this can be reached by helical winding it into the tube 34 or by meander like induction into the tube 34. For example, a hollow tube or trench provide a proper sheathing for the FBG in the use of a temperature sensor. Advantageously the tube 34 can be filled with air or a soft heat resistant filling material to improve the thermal contact to the environment. Instead of the tube 34 the fiber 31 can also be feed into a thin hole which is contained in the structure 30. For example, this hole can be accomplished by drilling or laser beaming the superalloy metal 30. The FBG can be embedded directly into parts of the turbine. The embedding into superalloy metal 30 or the TBC coating can be done by putting the fiber 31 into a trench 33 or a narrow gap or a groove (e.g. an U-shaped groove) 33. For example, the trench, gap or the groove can be closed by welding, brazing or braze-welding.

In the embodiment shown in FIG. 2, the fiber 31, which contains the burnt in FBG, is embedded in a steel capillary tube 34. In this embodiment, the preferred width d of the trench 33 is about 1 mm. This embodiment can be used advantageously for temperature measurement. Temperature sensors require strain relieved packaging.

Since of the metal coating of the fiber (e.g. a glass fiber) and the FBG and because of further protection mechanisms, such as superalloy tubes, half tubes (which face to the most aggressive side in a harsh environment) or superalloy capillaries the invention can advantageously used in harsh conditions. The life-cycle of the fiber and the FBG sensor will be therefore increased. The use of Fiber-Bragg-Grating (FBG) sensors for the accurate measurement of temperature and strain is well known. For example, in "Tunable Lasers and Fiber-Bragg-Grating Sensors" an article by Mark Wippich and Kathy Li Dessau, published in The Industrial Physicist, June/July 2003 is the physical principle of FBG sensors displayed, but it is not disclosed how to use FBG sensors in harsh conditions.

It is understood by those, skilled in the art, that more than one fiber can be placed in a trench or that more trenches build. In the superalloy, in the TBC coating or in both.

Among others, the invention discloses that fiber optical gratings (FBG) can be used for the measurement of strain and temperature in different applications, especially under extreme heating conditions, which can occur in power generators or other articles of manufacture. A advantage of fiber optics is the very high elasticity of the fiber which makes it useful also for long term applications. The possible use of up to 10 sensors in one fiber reduces the effort for wiring. This is especially important for rotating parts. The invention can be used for commercial FBG (generally understood as limited to temperatures up to 40020 C.) and for FBG of type II (generally understood as limited to temperatures up to about 1200° C. or more). Therefore the invention can be used for the measurement of parts, which are exposed to a very high temperature of 1200° C. or more.

The embedding of these gratings into metal structures can be performed in many ways as understood by those skilled in the art as described in the printed publications "Evaluation of a new method for metal embedding of optical fibres for high temperature sensing purposes" by Stefan Sandlin and Liisa Heikinheimo in VTT Symposium 212, Baltica V Conference, Condition and Life Management for Power Plants, Porvoo, FI, Jun. 6–8, 2001, Vol. 2, VTT Manufacturing Technology, Espoo (2001), pp. 547–558 and "Metal embedding of optical fibres for condition monitoring" by Stefan Sandlin, Tuomo Kinnunen, Jaakko Rämä in Proceedings Mechanical Engineering Research New Possibilities by Co-operation, Seminar, Tampere, FI, Jan. 3, 2001, Academy of Finland, TUKEVA, Research Program on Future Mechanical Engineering, Tampere (2002), pp. 155–164.

One possible application field of the invention is the distributed temperature measurement inside gas turbine vanes of row one and two. The FBG sensors can be placed in critical regions of the vane on the inner wall side. The embedding of the FBG sensors can be done by one of the techniques described above or other suitable technology.

Another application field of the invention is measurement of strain and temperature on rotating turbine blades and on the shaft. The strain sensors can be mounted either on the outer or the inner surface of the turbine blades. All FBG are mounted with one of the described techniques above or other similar techniques. The signal transmission to the stator also can be done by any suitable technique, such as a collimated optical beam located along the axis at the end of the shaft. The FBG interrogation unit can be placed on the shaft or otherwise located. The interrogation unit of an FBG sensor measures the wavelength shift of an FBG which can be caused either by temperature or by strain as described above. Then the signal transmission is done by telemetric or other suitable means. Since the FBG is burnt in the fiber, the fiber itself advantageously functions as the lead which transmits light (from a light source) to the FBG region (FBG sensor) and back to a spectrometer. The use of efficient means for signal transmission and powerful processing means as interrogation unit or as supporting device for the interrogation unit, enables real-time or near real-time measurements. Such means are powerful glass fibers, processors among others.

Figure 4:
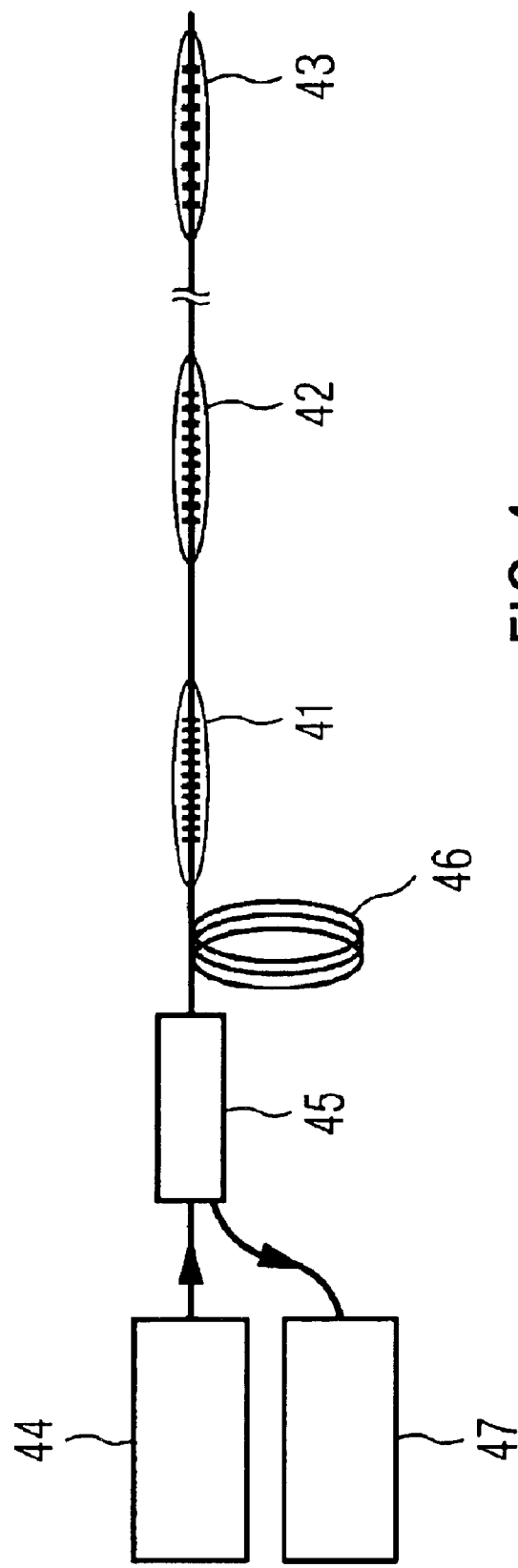
FIG. 4 shows an exemplary configuration of the sensors disclosed in the invention.

FIG. 4 shows a typical configuration of the sensors disclosed in the invention. A FBG sensor requires a light source 44, e.g. a broadband light source, such as an amplified-spontaneous-emission (ASE) white-light source. The light sources provides an incident spectrum which covers all wavelengths of the sensors 41, 42, 43. The light is led into the feed line 46 via a coupler 45. Placing many sensors on a single fiber, each sensor 41, 42, 43 must have its dedicated wavelength segment so that various signals do not overlap. Wavelength shifts which are indicating changes in strain, stress or temperature are measured by an interrogation unit, such as a spectrometer 47. For example, in a turbine the interrogation unit can be placed on the shaft. The signal transmission to the sensors 41, 42, 43 and back can be done by any telemetric means (e.g. collimated optical beams).

A further application of the invention is distributed temperature measurement in critical parts with high temperature gradients. This can be for instance turbine walls or large tubes for cooling air, steam or hot water with inhomogeneous temperature distribution. The measurement of temperature along the gradient helps to recognize mechanical stress which is caused by different thermal expansion. Thus the lifetime of such components can be predicted by continuous measurement of the gradient. Critical states can therefore easily detected. For the prevention of early damage engine or turbine parameters can be controlled actively.

In the case of higher power demand in a turbine, the invention allows the thorough monitoring of critical parameters such as temperature or strain, which enables a closer operating to the technical limits without the risk of damage. This aspect is very attractive to the customer.

Furthermore the invention enables to optimize the dimensions and properties of critical system parameters. Therefore the invention can also be used as development tool for turbines or components of turbines (e.g. blades, vanes, shafts).

While a specific embodiment of the invention has been described in detail, it will be appreciated by those skilled in the art that various modifications and alternatives to those details could be developed in light of the overall teachings of the disclosure. Also aspects of one or more embodiments can be used or combined with aspects of one or more other embodiments. Accordingly, the particular arrangements disclosed are meant to be illustrative only and not limiting as to the scope of the invention which is to be given the full breadth of the appended claims and any and all equivalents thereof.

We claim:

1. A method of monitoring the condition of a thermal barrier coating within a turbine engine having an operating temperature in excess of 1200° C., said method comprising:

embedding and thermally protecting a fiber lead into the thermal barrier coating;

embedding at least one fiber Bragg grating sensor into the thermal barrier coating such that the fiber Bragg grating is affected by a thermal or mechanical expansion of the thermal barrier coating; and using the thermal or mechanical expansion of the thermal barrier coating or the changing of a refraction index of the fiber to determine changes in temperature or strain of the thermal barrier coating, wherein the fiber lead is placed into a thin hole of the substrate, and wherein the fiber lead is placed loose in the hole.

2. A method of monitoring according claim 1, wherein the fiber lead is thermally protected by placing into a thin stainless steel or Nickel tube.

3. A method of monitoring according claim 2, wherein the fiber Bragg grating is placed into the thin stainless steel or Nickel tube.

4. A method of monitoring according claim 2, wherein the thin stainless steel or Nickel tube is filled with air or a soft heat resistant filling material.

5. A method of monitoring according claim 3, wherein the fiber Bragg grating is placed loose in the tube.

6. A method of monitoring according claim 5, wherein the fiber Bragg grating is placed by a helical winding in the tube.

7. A method of monitoring according claim 5, wherein the fiber Bragg grating is placed meander like in the hole.

8. A method of monitoring according claim 1, wherein the fiber lead is placed by a helical winding in the hole.

9. A method of monitoring according claim 8, wherein the fiber lead is placed meander like in the hole.

10. A method of monitoring according claim 1, wherein the fiber lead or the fiber Brag gratings are embedded inclined to the surface of the thermal barrier coating or a metal component to which the thermal barrier coating is attached.

11. A method of monitoring according claim 10, wherein the fiber lead or the fiber Brag gratings are embedded in the thermal barrier coating and a metal component to which the thermal barrier coating is attached.

12. A method of monitoring according claim 1, wherein the monitoring is performed real-time or near real-time.

13. A method of monitoring according claim 1, wherein the fiber Bragg grating sensor is mounted on or within a carrier.

14. A method of monitoring according claim 13, wherein the carrier is a ceramic carrier.

15. An apparatus for monitoring the condition of a metal component, said apparatus comprising:

a fiber lead embedded into the metal component, wherein the fiber lead is placed into a thin hole of the substrate, and wherein the fiber lead is placed loose in the hole;

at least one fiber Bragg grating sensor embedded into the metal component, such that the fiber Bragg grating is affected by a thermal or mechanical expansion of the metal component; and a mechanism using the thermal or mechanical expansion of the metal component or the changing of a refraction index of the fiber to determine changes in temperature or strain.

16. An apparatus according claim 15, wherein the thermal barrier coating or the metal component are within a turbine engine.

17. An apparatus according claim 15, further comprising devices for real-time or near real-time measurement.

18. An apparatus according claim 15, further comprising a light source which provides an incident spectrum which covers all wavelengths of the sensors.

19. A metal component within a turbine engine, comprising:
- a fiber lead embedded into said metal component, wherein the metal component is coated with a ceramic thermal barrier coating;
- at least one fiber Bragg grating sensor embedded into said metal component, wherein the fiber Bragg grating is affected by a thermal or mechanical expansion of the metal component;
- a light source which provides an incident spectrum which covers all wavelengths of the sensors; and
- a mechanism adopted to use the thermal or mechanical expansion of the metal component or the changing of a refraction index of the fiber to determine changes in temperature or strain of the metal component.

20. A method of monitoring the condition of a thermal barrier coating within a turbine engine having an operating temperature in excess of 1200° C., said method comprising:
- embedding and thermally protecting a fiber lead into the thermal barrier coating;
- embedding at least one fiber Bragg grating sensor into the thermal barrier coating such that the fiber Bragg grating is affected by a thermal or mechanical expansion of the thermal barrier coating; and
- using the thermal or mechanical expansion of the thermal barrier coating or the changing of a refraction index of the fiber to determine changes in temperature or strain of the thermal barrier coating, wherein the fiber Bragg grating sensor is mounted on or within a ceramic carrier.

21. A method of monitoring the condition of a thermal barrier coating within a turbine engine having an operating temperature in excess of 1200° C., said method comprising:
- embedding directly a fiber lead into the thermal barrier coating and
- thermally protecting a fiber lead into the thermal barrier coating;
- embedding at least one fiber Bragg grating sensor into the thermal barrier coating such that the fiber Bragg grating is affected by a thermal or mechanical expansion of the thermal barrier coating; and
- using the thermal or mechanical expansion of the thermal barrier coating or the changing of a refraction index of the fiber to determine changes in temperature or strain of the thermal barrier coating.

* * * * *